US010148085B2

(12) United States Patent
Bobert et al.

(10) Patent No.: US 10,148,085 B2
(45) Date of Patent: Dec. 4, 2018

(54) SURGE ARRESTER HAVING PROTECTION AGAINST HEATING

(71) Applicant: EPCOS AG, Munich (DE)

(72) Inventors: Peter Bobert, Falkensee (DE); Peter Heide, Berlin (DE)

(73) Assignee: EPCOS AG, Munich (DE)

( * ) Notice: Subject to any disclaimer, the term of this patent is extended or adjusted under 35 U.S.C. 154(b) by 177 days.

(21) Appl. No.: 15/123,169

(22) PCT Filed: Feb. 19, 2015

(86) PCT No.: PCT/EP2015/053511
§ 371 (c)(1),
(2) Date: Sep. 1, 2016

(87) PCT Pub. No.: WO2015/135731
PCT Pub. Date: Sep. 17, 2015

(65) Prior Publication Data
US 2017/0117703 A1    Apr. 27, 2017

(30) Foreign Application Priority Data
Mar. 13, 2014  (DE) .................. 10 2014 103 419

(51) Int. Cl.
*H02H 9/04* (2006.01)
*H01T 1/14* (2006.01)
*H01T 4/12* (2006.01)

(52) U.S. Cl.
CPC .............. *H02H 9/043* (2013.01); *H01T 1/14* (2013.01); *H01T 4/12* (2013.01)

(58) Field of Classification Search
CPC .......... H02H 9/04; H02H 9/041; H01C 7/126; H01C 7/12; H01T 1/14
(Continued)

(56) References Cited

U.S. PATENT DOCUMENTS

| 4,493,005 A | 1/1985 | Lange |
| 5,248,953 A * | 9/1993 | Honl ........................ H01T 1/14 337/28 |
| 5,999,412 A | 12/1999 | Busse et al. |
| 6,445,560 B1 * | 9/2002 | Bobert ..................... H01T 1/14 361/120 |

(Continued)

FOREIGN PATENT DOCUMENTS

| DE | 1018521 B | 10/1957 |
| DE | 3146787 A1 | 6/1983 |

(Continued)

*Primary Examiner* — Dharti H Patel
(74) *Attorney, Agent, or Firm* — Slater Matsil, LLP

(57) ABSTRACT

A surge arrester is disclosed. In an embodiment the surge arrester includes a first electrode for applying a first voltage potential to the surge arrester, a second electrode for applying a second voltage potential to the surge arrester, and a short-circuiting link for short-circuiting the first and second electrodes. The surge arrester further includes a retaining element for retaining the short-circuiting link, wherein the retaining element is embodied in such a way that it keeps the short-circuiting link at a distance from the first and second electrodes when a temperature is below a threshold value, and it shifts the short-circuiting link such that the short-circuiting link is pressed against the first and second electrodes and a short-circuit is produced between the first and second electrodes when the temperature exceeds the threshold value.

15 Claims, 2 Drawing Sheets

(58) Field of Classification Search
USPC .................................. 361/117–119, 124, 129
See application file for complete search history.

(56) References Cited

U.S. PATENT DOCUMENTS

| | | | |
|---|---|---|---|
| 6,909,183 B2 * | 6/2005 | Feiertag | H01L 23/49816 257/737 |
| 7,974,063 B2 * | 7/2011 | Vo | H01T 1/14 361/119 |
| 8,203,819 B2 | 6/2012 | Bobert | |
| 8,217,750 B2 * | 7/2012 | Machida | H01T 1/14 337/1 |
| 8,274,775 B2 * | 9/2012 | Bobert | H01T 1/14 361/124 |
| 9,958,336 B2 * | 5/2018 | Ihle | G01K 1/08 |
| 2011/0013335 A1 * | 1/2011 | Bobert | H01T 1/14 361/118 |
| 2011/0299211 A1 * | 12/2011 | Bobert | H01T 1/14 361/124 |

FOREIGN PATENT DOCUMENTS

| | | |
|---|---|---|
| DE | 4118738 C1 | 12/1992 |
| DE | 19620340 C1 | 10/1997 |
| DE | 102008022794 A1 | 8/2009 |
| EP | 0516922 A2 | 2/1992 |
| JP | 6897281 A | 6/1983 |
| JP | 6198243 A | 8/1993 |
| JP | 2011511406 A | 4/2011 |
| WO | 3706399 A1 | 10/1987 |
| WO | 2009095206 A1 | 8/2009 |

* cited by examiner

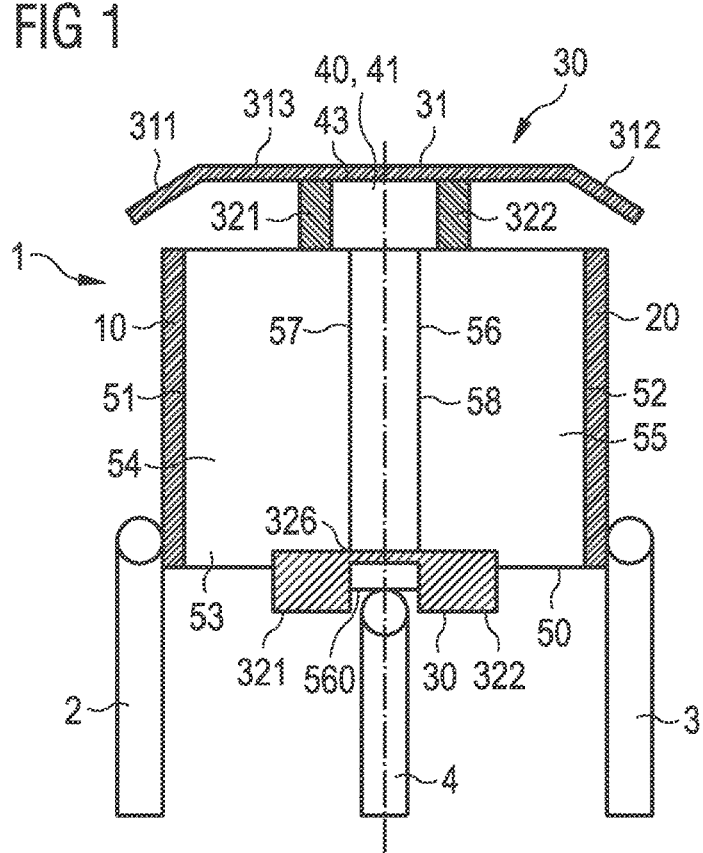
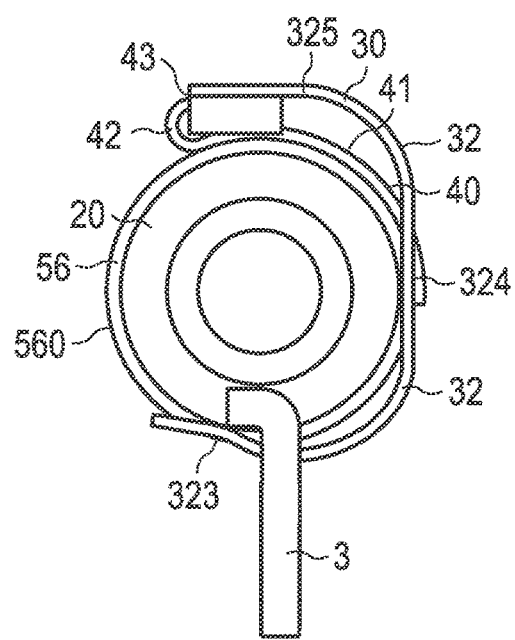

SURGE ARRESTER HAVING PROTECTION AGAINST HEATING

This patent application is a national phase filing under section 371 of PCT/EP2015/053511, filed Feb. 19, 2015, which claims the priority of German patent application 10 2014 103 419.8, filed Mar. 13, 2014, each of which is incorporated herein by reference in its entirety.

TECHNICAL FIELD

The invention relates to a surge arrester having protection against heating as soon as a threshold value of a temperature of the surge arrester is exceeded.

BACKGROUND

Surge arresters are used to limit dangerous surges in electrical lines or devices. Gas-filled surge arresters are often used to protect small devices. A gas-filled surge arrester is usually composed of a small tube made of ceramic material which is closed off in an air-tight fashion at each of its open ends by an electrode. There is a noble gas in the interior of the small ceramic tube. The noble gas constitutes a high resistance when a voltage below a threshold value is present between the electrodes of the arrester, with the result that no current flows through the arrester. If the voltage which is present at the electrodes exceeds the level of a trigger voltage, the resistance of the arrester drops to very low values within microseconds. In the triggered state of the arrester, current peaks up to several kiloamperes are able to be diverted.

After the triggering of the arrester, a current flows between the two electrodes through the noble gas atmosphere in the interior of the arrester. The time when the arrester triggers is defined by the type of noble gas, by the pressure of the gas and the distance between the electrodes. Owing to the high current flowing through the arrester, heating occurs at the arrester in the triggered state. When a driving voltage which is present at the arrester decreases again below the level of the arc voltage or when current flowing through the arrester drops below a specific level again, the arrester is switched off and the internal resistance resumes its original operating state with several 100 MΩ.

However, under certain electrical conditions surge arresters cannot return to the non-conductive state again after they have been triggered. This situation occurs, for example, when a voltage above the trigger voltage is continuously present between the electrodes of the arrester. The current with a high current level which then flows through the arrester over a relatively long time can result in the arrester and its surroundings heating up to a great extent. If the arrester is not switched off in good time, it can finally become so hot that it is destroyed or its surroundings, for example on a circuit board are heated up so strongly than the components located in the surroundings are destroyed. In the case of extreme heating, the surroundings of the arrester can even catch fire. In order to avoid this, it must be ensured that the surge arrester switches off in good time, with the result overheating of the arrester and its surroundings can be prevented.

SUMMARY OF THE INVENTION

The present invention is aimed at specifying a surge arrester having protection against heating, with which it is ensured that when a threshold value of a temperature is exceeded owing to heating the arrester switches off quickly and reliably.

According to one possible embodiment, the surge arrester having protection against heating comprises a first electrode for applying a first voltage potential to the surge arrester, a second electrode for applying a second voltage potential to the surge arrester, a short-circuiting link for short-circuiting the first and second electrodes, and a retaining element for retaining the short-circuiting link. The retaining element is embodied in such a way that at a temperature below a threshold value it keeps the short-circuiting link at a distance from the first and second electrodes, and when the threshold value of the temperature is exceeded with respect to the short-circuiting link, it shifts in such a way that the short-circuiting link is pressed against the first and second electrodes, as a result of which a short-circuit is produced between the first and second electrodes.

Owing to the short-circuiting link and the retaining element, the surge arrester has a mechanical short-circuiting mechanism by which it is short-circuited in the case of a raised temperature, with the result that excessive heating of the arrester itself as well as of its surroundings can be prevented. The retaining element can have a region which is bent in the shape of a stirrup and a supporting region on which the short-circuiting link rests in the case of a temperature below the threshold value of the temperature. The short-circuiting link can be shaped in such a way that it rests under mechanical stress on the supporting region of the retaining element.

When the threshold value of the temperature is exceeded, the materials of the retaining element expand in such a way that the short-circuiting link slips off the supporting region of the retaining element. The retaining element releases the short-circuiting link, with the result that owing to the mechanical prestress it is then pressed against the first and second electrodes and brings about a short-circuit between the first and second electrodes. The retaining element can for this purpose contain materials which expand differently in the case of heating, with the result that the retaining element, in particular the bent section of the retaining element, is bent with respect to the original state. The retaining element can contain, for example, a material formed from a thermal bimetal.

According to one embodiment, the surge arrester can comprise a hollow body having a cavity which is sealed in a hermetically tight fashion at the two open ends by the first and second electrodes. A noble gas can be located in the interior of the cavity. The short-circuiting link and the retaining element can be permanently connected to one another at at least one of their sections, with the result that the short-circuiting mechanism comprising the retaining element and the short-circuiting link is composed of just a single component. The short-circuiting link and the retaining element can, for example, be welded to one another at one point.

The short-circuiting link and the retaining element can be attached to the hollow body of the surge arrester. As stated above, the short-circuiting link can be shaped or bent here in such a way that it is held with prestress on the supporting region of the retaining element at a distance from the first and second electrodes as long as the temperature of the arrester is below the threshold value. When the threshold value of the temperature is exceeded, the retaining element or the supporting region of the retaining element is shifted in such a way that the short-circuiting link which is under mechanical stress is released immediately and therefore the distance between the first and second electrodes of the arrester is very quickly bridged. As a result of the quickly closing contact, flashovers during the approaching movement and therefore burning off the material can be prevented.

The short-circuiting mechanism composed of the short-circuiting link and the retaining element can be attached, in particular as part of a 3-electrode arrester to a hollow body of the 3-electrode arrester. In the embodiment as a 3-electrode arrester, the hollow body has a first and a second partial body as well as a metallic ring which is arranged in the two partial bodies and which forms the third electrode. The short-circuiting link is attached at one point to the retaining element which is arranged on the metallic ring. When the short-circuiting link is released after the threshold value of the temperature is exceeded, the short-circuiting link closes the first and second electrodes briefly, with the result that the first, the second and the third electrodes are connected to one another conductively.

BRIEF DESCRIPTION OF THE DRAWINGS

The invention will be explained in more detail below with reference to figures which show exemplary embodiments of the present invention, in which:

FIG. 1 shows an embodiment of a surge arrester having protection against heating in a longitudinal view before the triggering of the short-circuiting mechanism;

FIG. 2 shows an embodiment of a surge arrester having protection against heating in a transverse view before the triggering of the short-circuiting mechanism;

DETAILED DESCRIPTION OF ILLUSTRATIVE EMBODIMENTS

Figure 3:
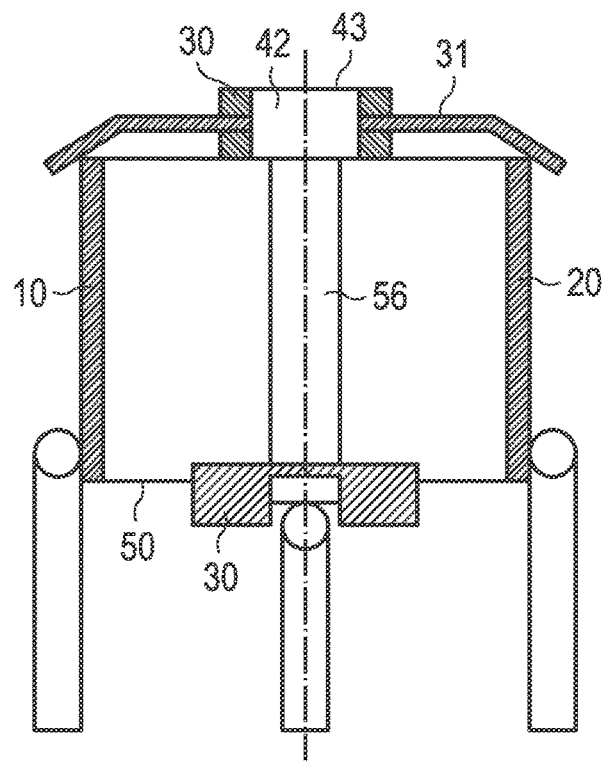
FIG. 3 shows an embodiment of a surge arrester having protection against heating in a longitudinal view after the triggering of the short-circuiting mechanism.

FIG. 1 shows a longitudinal view and FIG. 2 shows the corresponding transverse view of an embodiment of a surge arrester 1 having protection against heating with a short-circuiting mechanism by which the arrester can be short-circuited in the case of a raised temperature, with the result that further and excessive heating of the arrester component is prevented. The surge arrester 1 comprises an electrode 10 for applying a first voltage potential to the arrester, and a second electrode 20 for applying a second voltage potential to the arrester. The first and second electrodes 10, 20 are arranged on the open sides of a hollow body 50 of the arrester. The hollow body 50 has a cavity 53 between a first opening 51 and a second opening 52 in the hollow body. The hollow body 50 can be embodied, for example, as a small tube composed of a ceramic material.

The first opening 51 in the hollow body 50 is covered by the first electrode 10. The second opening 52 in the hollow body 50 is covered by the second electrode 20. The first and second electrodes 10, 20 are arranged on the open sides 51, 52 of the hollow body in such a way that the cavity 53 is sealed in a hermetically tight fashion by the first and second electrodes. There can be a gas, for example a noble gas, located in the cavity 53. The electrode 10 is connected to an electrical conductor 2 for applying the first voltage potential to the arrester. An electrical conductor 3 for applying the second voltage potential to the arrester is arranged on the second electrode 20.

In the embodiment shown in FIGS. 1 and 2, the surge arrester is embodied as what is referred to as a 3-electrode arrester. In this embodiment, the hollow body 50 has a first partial body 54 embodied as a hollow cylinder and a second partial body 55 embodied as a hollow body, said partial body 54 and partial body 55 each being composed of a ceramic material, and the hollow body 50 additionally comprising a metallic ring 56 which forms a third electrode of the arrester. A line 4 for feeding a third voltage potential is arranged on the third electrode 56 of the arrester. In the embodiment of the 3-electrode arrester shown in FIGS. 1 and 2, a ground potential is present, for example, to the third electrode.

The first partial body 54 of the hollow body 50 comprises the first opening 51 which is covered by the first electrode 10, and a further opening 57. The second partial body 55 of the hollow body 50 has the second opening 52 of the hollow body, which opening 52 is covered by the second electrode 20, and said second partial body 55 additionally comprises a further opening 58. The metallic ring 56 is arranged between the further opening 57 in the first partial body 54 and the further opening 58 in the second partial body 55. A continuous cavity is therefore formed between the first opening 51 and the second opening 52.

The first and second partial bodies 54, 55 can have the same external diameter. The metallic ring 56, which forms the third electrode of the surge arrester, can have a larger external diameter than the first and second partial bodies 54, 55. As a result, an edge 560 of the metallic ring 56 projects out of the planar surface of the first and second partial bodies 54, 55. The internal diameter of the metallic ring 56 can be smaller than the internal diameter of the first and second partial bodies, with the result that the internal diameter of the hollow body 50 in the region of the metallic ring/the third electrode 56 is smaller than in the region of the first and second partial bodies 54, 55.

The gas-filled surge arrester 1 which is shown in FIGS. 1 and 2 operates according to the physical gas principle of arc discharging. The surge arrester behaves electrically as a voltage-dependent switch. As soon as the voltage present between the first and second or third electrode or the voltage present between the second and first or third electrode exceeds the level of a trigger voltage or response voltage, an arc is formed within fractions of a second in the gas-tight discharge space 53 of the arrester.

The surge which is present between the first and second electrodes is short-circuited by the high current carrying capability and the burn voltage of the arc which is virtually independent of the current. When the surge decreases, the current in the arc is depleted until the level of a minimum current of the arrester required to maintain the arc discharge is undershot. The arc discharge breaks down and the arrester switches off after passing through a corona phase. The internal resistance of the arrester resumes its original operating state with several 100 MΩ.

If a high voltage level above the level of the trigger voltage is continuously present between the electrodes of the surge arrester, the surge arrester may not be reset again into the non-conductive state after the triggering. As a result of the high current level of the current which flows between the first and second electrodes 10, 20 or in the case of the 3-electrode arrester between the first or second electrodes 10, 20 and the third electrode 30 of the arrester, excessive heating can occur at the arrester and can result in the arrester being destroyed or even cause a fire.

In order to prevent the excessive heating of the surge arrester, the latter has a mechanical short-circuiting mechanism in the form of a short-circuiting link 30 for short-circuiting the first and second electrodes 10, 20 and a retaining element 40 for retaining the short-circuiting link 30. In the embodiment of a 3-electrode arrester shown in FIGS. 1 and 2, the short-circuiting link 30 is designed to short-circuit the first electrode 10, the second electrode 20 and the third electrode 30. The short-circuiting link 30 is shaped for this purpose in such a way that it is pressed under mechanical stress against the retaining element 40 as long as the temperature of the arrester is below the threshold value. The retaining element 40 is configured in such a way that a temperature below the threshold value of the temperature it keeps the short-circuiting link 30, which is pressed against the retaining element owing to the mechanical prestress, at a distance from the first and second electrodes 10, 20.

Figure 4:
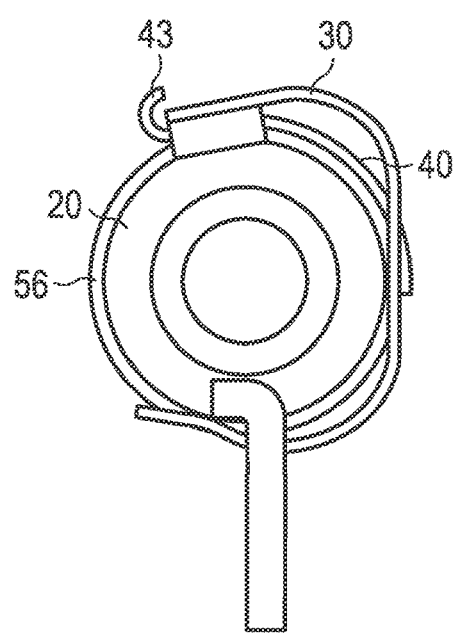
FIG. 4 shows an embodiment of a surge arrester having protection against heating in a transverse view after the triggering of the short-circuiting mechanism.

FIG. 3 shows the surge arrester illustrated in FIG. 1 in a longitudinal view after the triggering of the short-circuiting mechanism. FIG. 4 shows a transverse view of the surge arrester in FIG. 3 after the triggering of the short-circuiting mechanism. The retaining element 40 is embodied in such a way that when the threshold value of the temperature is exceeded the retaining element shifts with respect to the short-circuiting link 30 in such a way that the short-circuiting link 30 is released and is pressed against the first and second electrodes owing to the mechanical stress. The short-circuiting link then forms a low-resistance connection between the first and second electrodes. This results in a short-circuit between the first and second electrodes 10, 20.

The short-circuiting link 30 has a bridging region 31 for electrically bridging a distance between the first and second electrodes 10, 20. The short-circuiting link 30 and the retaining element 40 can be embodied in such a way that the bridging region 31 of the short-circuiting link is held under mechanical stress by the retaining element 40 at the distance from the first and second electrodes 10, 20 if the temperature of the arrester is below the threshold value of the temperature.

The bridging region 31 of the short-circuiting link 30 can have a first end part 311 and a second end part 312 as well as a center part 313 arranged between the first and second end parts 311, 312. The first and second end parts 311, 312 of the bridging region 31 of the short-circuiting link are bent away from the plane in which the center point 313 of the bridging region 31 of the short-circuiting link are arranged bent away from a plane, in which the center part 313 of the bridging region 31 of the short-circuiting link is arranged, and are bent in the direction of the first and second electrodes 10, 20. The bridging region 31 contains a low-resistance material, with the result that it short-circuits the distance between the electrodes 10 and 20.

According to one possible embodiment of the surge arrester 1, the retaining element 40 can have a region 41 which bears against the hollow body 50. The region 41 of the retaining element 40 can bear, for example, along approximately one quarter of the circumference of the hollow body 50. Furthermore, the retaining element 40 can have a bent region 42 which adjoins the region 41, is bent away from the surface of the hollow body 50 and is bent toward the bridging region 31 of the short-circuiting link 30. The retaining element 40 can, moreover, have a supporting region 43 which adjoins the bent region 42 and against which the bridging region 31 of the short-circuiting link 30 rests on the retaining element 40 if the temperature is below the threshold value. The supporting region 43 can have a larger area than the bent region 42. In another embodiment of the surge arrester, the supporting region 42 can be embodied merely as a prolongation of the bent region 42.

According to one possible embodiment, the retaining element 40 can be embodied in such a way that when the threshold value of the temperature is exceeded the bent region 42 and/or at least the supporting region 43 of the retaining element 40 bends with respect to the bridging region 31 of the short-circuiting link 30 in such a way that the bridging region 31 of the short-circuiting link 30 steps off the supporting region 43 of the retaining element 40 and, owing to its mechanical prestress, is pressed against the first and second electrodes 10, 20.

The retaining element 40 can be embodied, for example, as a wire link on the supporting region 43 of which the bridging region 31 of the short-circuiting link rests when the short-circuiting mechanism is deactivated, with the result that the bridging region of the short-circuiting link is arranged at a distance from the first and second electrodes 10, 20. The retaining element 40 can contain, for example, a material made of a thermal bimetal. As a result, when the threshold value of the temperature is exceeded, the bending of the retaining element 40 occurs, as a result of which the short-circuiting link is released and the bridging region 31 snaps against the electrodes of the surge arrester as a result of the mechanical prestress of the short-circuiting link without delay.

According to one possible embodiment of the surge arrester, the short-circuiting link 30 can have a retaining region 32 on which the bridging region 31 of the short-circuiting link is arranged. The retaining region 32 of the short-circuiting link can have a support section 323 which rests on the surface of the hollow body 50. Furthermore, the retaining region 32 of the short-circuiting link can have an attachment section 324 which is attached to the region 41 of the retaining element 40 which bears on the surface of the hollow body 50. The short-circuiting link 30 is permanently connected to the retaining element 40 at the attachment section 324. The short-circuiting link can be welded, for example at the attachment section 324, to the retaining element, in particular to the region 41 of the retaining element 40 which bears on the hollow body 50. The short-circuiting link can bear on the hollow body 50 at the attachment section 324.

The retaining region 32 of the short-circuiting link can furthermore have an end section 325 on which the bridging region 31 of the short-circuiting link is arranged. The bridging region 31 of the short-circuiting link can be embodied, for example, as a wire or a plate which adjoins the end section 325 of the retaining region 32. The bridging region 31 of the short-circuiting link can be soldered or welded, for example, to the end section 325 of the retaining region of the short-circuiting link. The bridging region 31 of the short-circuiting link can be arranged, for example, at a right angle to the retaining region 32.

The short-circuiting link 30 can be bent in such a way that a section between the supporting section 323 and the attachment section 324 is bent away from the hollow body 50 and spaced apart therefrom, with the result that this region does not bear on the hollow body. Furthermore, the short-circuiting link 30 can be bent in such a way that the end section 325 and a section between the end section 325 and the attachment section 324 is spaced apart from the region 41 of the retaining region 40.

The short-circuiting link 30 is bent between the supporting section 323 and the end section 325 of the retaining region 32 in such a way that the bridging region 31 of the short-circuiting link is pressed under mechanical stress against the supporting region 43 of the retaining element 40 if the temperature is below the threshold value. The retaining region 32 of the short-circuiting link can be embodied as a wire which, as is shown in FIGS. 1 to 4, is bent around the hollow body 50. The retaining region 32 can be bent, for example, in a C shape about the hollow body. The retaining region 32 of the short-circuiting link can bear on the hollow body 50 at the attachment section 324.

In the embodiment of the surge arrester as a 3-electrode arrester, the region 41 of the retaining element 40 bears on the metallic ring 56 of the hollow body 50 which forms the third electrode of the arrester. As is shown by means of FIGS. 2 and 4, the region 41 of the retaining element 40 bears on approximately one quarter of the circumference of the metallic ring 56 of the hollow body 50. The retaining element 40 is permanently connected at the region 41 to the hollow body 50, in particular the metallic ring 56. For example in the embodiment of the 3-electrode arrester, the region 41 of the retaining element 40 can be welded onto the metallic ring 56.

In the embodiment of the surge arrester as a 3-electrode arrester, the retaining region 32 of the short-circuiting link 30 can be connected at the attachment section 324 to the region 41 of the retaining element which bears on the third electrode 56. As a result, the short-circuiting link is connected in an electrically conductive fashion to the third electrode 56. When the threshold value of the temperature is exceeded, the bent region 42 and/or the supporting region 43 of the retaining element 40 bends with respect to the bridging region 31 of the short-circuiting link 30 in such a way that the bridging region 31 of the short-circuiting link 30 stands off from the supporting region 43 of the retaining element 40, with the result that the short-circuiting link is released and is pressed against the first electrode 10 and the second electrode 20. The first electrode 10, the second electrode 20 and the third electrode 30 are therefore connected to one another conductively via the short-circuiting link.

As already explained, in the embodiment of the surge arrester as a 3-electrode arrester the metallic ring 56 can have a larger external diameter than the first and second partial bodies 54, 55, as a result of which the edge 560 of the metallic ring projects from the surface of the first and second partial bodies 54, 55. According to the embodiment of the 3-electrode arrester which is shown in FIGS. 1 to 4, the retaining region 32 of the short-circuiting link 30 has a first web 321 and a second web 322, wherein the second web 322 is spaced apart from the first web 321 by a gap width. The short-circuiting link 30 is arranged, in particular, on the hollow body 50 of the 3-electrode arrester in such a way that the metallic ring 56 and the retaining element 40 are arranged between the first and second webs 321, 322 of the retaining region 32 of the short-circuiting link. The bridging region 31 of the short-circuiting link is arranged at the respective end sections 325 of the first and second webs 321, 322. As is shown by means of FIGS. 1 and 3, the first and second webs 321, 322 can be connected to one another by means of a small intermediate web 326 behind the respective supporting section 323 of the two webs.

Owing to the fixing of the short-circuiting link 30 in the region of the attachment section 324 on the retaining element 40, the entire short-circuiting mechanism in the case of the inventive surge arrester is composed of just a single component which, when the surge arrester is assembled, can be attached in its entirety to the hollow body, and in the embodiment of the 3-electrode arrester, in particular on the metallic ring 56 of the hollow body. With the short-circuiting mechanism composed of the short-circuiting link 30 and the retaining element 40 it is possible to detect when a threshold value of a temperature is exceeded and to activate the short-circuit between the first and second electrodes. In contrast to an embodiment of a short-circuiting mechanism in which a solder pellet keeps a short-circuiting link away from the contact with the electrodes of the surge arrester as long as the temperature is below the threshold value, the short-circuiting of the short-circuiting mechanism composed of the short-circuiting link 30 and the retaining element 40 takes place significantly more quickly, since the soft solder of a solder pellet melts only slowly at a raised temperature, while the short-circuiting link 30 is released suddenly after the bending of the retaining element and impacts on the electrodes of the surge arrester when the threshold value of the temperature of the arrester is exceeded. Owing to the rapid movement of the short-circuiting link, the occurrence of a flashover and therefore of burning of material during the movement of the bridging region 31 of the short-circuiting link against the electrodes of the surge arrester is prevented.

The invention claimed is:

1. A surge arrester comprising:
   a first electrode for applying a first voltage potential to the surge arrester,
   a second electrode for applying a second voltage potential to the surge arrester,
   a short-circuiting link for short-circuiting the first and second electrodes,
   a retaining element having a supporting region for retaining the short-circuiting link,
   wherein the retaining element is embodied in such a way that the short-circuiting link is supported by the supporting region and the short-circuiting link is kept at a distance from the first and second electrodes when a temperature is below a threshold value, and materials of the retaining element expand in such a way that the short-circuiting link slips off the supporting region of the retaining element and the short-circuiting link is pressed against the first and second electrodes and a short-circuit is produced between the first and second electrodes when the temperature exceeds the threshold value.

2. The surge arrester according to claim 1, wherein the short-circuiting link and the retaining element are permanently connected to one another at at least one section of the short-circuiting link and the retaining element.

3. The surge arrester according to claim 1, further comprising a hollow body having a cavity between a first and a second opening of the hollow body, wherein the first opening is covered by the first electrode and the second opening is covered by the second electrode in such a way that the cavity is hermetically tight sealed.

4. The surge arrester according to claim 3, wherein the retaining element is attached to the hollow body.

5. The surge arrester according to claim 1, wherein the retaining element contains a thermal bimetal material.

6. The surge arrester according to claim 1, wherein the short-circuiting link has a bridging region for electrically bridging a distance between the first and second electrodes, and wherein the short-circuiting link is embodied in such a way that the bridging region is held under mechanical stress by the retaining element at the distance from the first and second electrodes when the temperature is below the threshold value.

7. The surge arrester according to claim 6, wherein the bridging region has a first and second end parts and a center part arranged between the first and second end parts, and wherein the first and second end parts of the bridging region are bent away from a plane, in which the center part of the bridging region is arranged, and are bent in a direction of the first and second electrodes.

8. The surge arrester according to claim 1, further comprising a hollow body,
wherein the retaining element has a region which bears against the hollow body,
wherein the retaining element has a bent region which adjoins the bearing region, is bent away from a surface of the hollow body and is bent toward a bridging region of the short-circuiting link,
wherein the retaining element has a supporting region which adjoins the bent region and against which the bridging region of the short-circuiting link rests on the retaining element when the temperature is below the threshold value.

9. The surge arrester according to claim 8, wherein the retaining element is embodied in such that when the threshold value of the temperature is exceeded at least one of the bent region and/or the supporting region of the retaining element bends with respect to the bridging region of the short-circuiting link such that the bridging region of the short-circuiting link steps off from the supporting region of the retaining element and is pressed against the first and second electrodes as a result of which the short-circuit is produced between the first and second electrodes.

10. The surge arrester according to claim 8, wherein the short-circuiting link has a retaining region against which the bridging region of the short-circuiting link is held, wherein the retaining region of the short-circuiting link has a supporting section which rests on the surface of the hollow body, an attachment section which is attached to the region of the retaining element which bears on the surface of the hollow body, and an end section on which the bridging region of the short-circuiting link is arranged, and wherein the short-circuiting link is bent between the supporting section and the end section of the retaining region in such a way that the bridging region of the short-circuiting link is pressed under mechanical stress against the supporting region of the retaining element when the temperature is below the threshold value.

11. The surge arrester according to claim 1, further comprising a hollow body,
wherein the hollow body has a first and a second partial body made of a ceramic material and a metallic ring,
wherein the first partial body has the first opening of the hollow body and a further opening,
wherein the second partial body has the second opening of the hollow body and a further opening,
wherein the metallic ring is arranged between the further opening in the first partial body and the further opening in the second partial body, and
wherein a region of the retaining element which bears against the hollow body bears against the metallic ring of the hollow body.

12. The surge arrester according to claim 11, wherein the retaining element is permanently connected to the metallic ring of the hollow body.

13. The surge arrester according to claim 11, wherein the metallic ring has a larger external diameter than the first and second partial bodies, and wherein an edge of the metallic ring projects from a surface of the first and second partial bodies.

14. The surge arrester according to claim 11, wherein a retaining region of the short-circuiting link has a first web and a second web spaced apart from the first web by a gap width, and wherein the short-circuiting link is arranged on the hollow body in such a way that the metallic ring of the hollow body and the retaining element are arranged between the first and second webs of the retaining region of the retaining element.

15. The surge arrester according to claim 11, wherein the metallic ring is embodied as a third electrode of the surge arrester, and wherein the surge arrester is embodied as a 3-electrode arrester.

* * * * *